US012671177B2

(12) United States Patent
Sasaki et al.

(10) Patent No.: US 12,671,177 B2
(45) Date of Patent: Jun. 30, 2026

(54) VARIABLE REFLECT ARRAY, AND METHOD FOR DESIGNING VARIABLE REFLECTOR ARRAY

(71) Applicant: Denki Kogyo Company, Limited, Tokyo (JP)

(72) Inventors: Takayoshi Sasaki, Tokyo (JP); Tanan Hongnara, Tokyo (JP); Yoshiki Shirasawa, Tokyo (JP); Katsumori Sasaki, Tokyo (JP)

(73) Assignee: Denki Kogyo Company, Limited, Tokyo (JP)

( * ) Notice: Subject to any disclaimer, the term of this patent is extended or adjusted under 35 U.S.C. 154(b) by 491 days.

(21) Appl. No.: 18/034,412

(22) PCT Filed: Oct. 25, 2021

(86) PCT No.: PCT/JP2021/039314
§ 371 (c)(1),
(2) Date: Apr. 28, 2023

(87) PCT Pub. No.: WO2022/092029
PCT Pub. Date: May 5, 2022

(65) Prior Publication Data

US 2023/0378644 A1 Nov. 23, 2023

(30) Foreign Application Priority Data

Oct. 30, 2020 (JP) ................................ 2020-182460

(51) Int. Cl.
*H01Q 3/46* (2006.01)
*H01Q 15/14* (2006.01)
(Continued)

(52) U.S. Cl.
CPC ............ *H01Q 3/46* (2013.01); *H01Q 15/148* (2013.01); *H01Q 15/167* (2013.01); *H01Q 15/248* (2013.01)

(58) Field of Classification Search
CPC ..... H01Q 3/46; H01Q 15/14–16; H01Q 15/00
See application file for complete search history.

(56) References Cited

U.S. PATENT DOCUMENTS 8,217,847 B2 * 7/2012 Sotelo .................... H01Q 15/14 343/912
2008/0104998 A1 5/2008 Tivey et al.
(Continued)

FOREIGN PATENT DOCUMENTS

JP 2000-121791 A 4/2000
JP 2001-133162 A 5/2001
(Continued)

OTHER PUBLICATIONS

Perez-Palomino, Gerardo et al., "Design and Experimental Validation of Liquid Crystal-Based Reconfigurable Reflectarray Elements With Improved Bandwidth in F-Band," IEEE Transactions on Antennas and Propagation, 2013, vol. 61, No. 4, pp. 1704-1713.
(Continued)

*Primary Examiner* — Alexander H Taningco
(74) *Attorney, Agent, or Firm* — Faegre Drinker Biddle & Reath LLP

(57) ABSTRACT

An object of the present invention is to make it possible to flexibly adjust the incidence wave directivity in a vertical plane or a horizontal plane by making the incident directivity reconfigurable. Provided is a variable reflect array, having a variable mechanism unit configured to change interval between the plurality of supercells, and, the variable mechanism unit is configured to change one of an incidence angle and a reflection angle with respect to the electromagnetic wave of the predetermined wavelength, and, keep the other
(Continued)

10 of the incidence angle and the reflection angle constant with respect to the electromagnetic wave of the predetermined wavelength, by changing the interval between the plurality of supercells.

12 Claims, 4 Drawing Sheets

(51) Int. Cl.
*H01Q 15/16* (2006.01)
*H01Q 15/24* (2006.01)

(56) References Cited

U.S. PATENT DOCUMENTS

| | | | | |
|---|---|---|---|---|
| 2012/0105305 | A1* | 5/2012 | Maruyama | H01Q 21/0018 343/912 |
| 2015/0015455 | A1* | 1/2015 | Maruyama | H01Q 21/0018 343/912 |
| 2015/0022414 | A1 | 1/2015 | Maruyama et al. | |
| 2015/0061966 | A1* | 3/2015 | Maruyama | G06F 30/00 343/912 |
| 2016/0013531 | A1 | 1/2016 | Casse et al. | |

FOREIGN PATENT DOCUMENTS

| | | | | | |
|---|---|---|---|---|---|
| JP | 2001-264491 | A | | 9/2001 | |
| JP | 2004-093090 | A | | 3/2004 | |
| JP | 2007-509476 | A | | 4/2007 | |
| JP | 2016-021741 | A | | 2/2016 | |
| JP | 2021048465 | A | * | 3/2021 | |
| JP | 2021-175054 | A | | 11/2021 | |
| JP | 2022108025 | A | * | 7/2022 | H01Q 3/46 |
| JP | 7500172 | B2 | | 6/2024 | |
| WO | WO-0167552 | A1 | * | 9/2001 | H01Q 15/10 |
| WO | WO-2013/128745 | A1 | | 9/2013 | |

OTHER PUBLICATIONS

Written Opinion of the International Searching Authority mailed Dec. 28, 2021 for PCT/JP2021/039314.
Decision to Grant a Patent issued Jan. 15, 2025 in corresponding Japanese Patent Application No. 2020-182460.

* cited by examiner

VARIABLE REFLECT ARRAY, AND METHOD FOR DESIGNING VARIABLE REFLECTOR ARRAY

TECHNICAL FIELD

The present invention relates to a variable reflector array and a variable reflector having metasurface, which has a variable structure of reflection directivity.

BACKGROUND ART

In communication, a reflector is installed in the propagation path in some case, for the purpose of compensating for high linearity and propagation loss in the millimeter wave band. It is desirable that the reflector arranged in the propagation path has a large aperture size and a gain of 75 dBi or more in terms of antenna gain.

The gain of the metamaterial reflector changes according to the aperture size. On a purpose of compensating for the gain, it is necessary to increase the size of the reflector. However, when the gain is increased, the directivity becomes sharp, so the installation accuracy at the installation greatly affects the installation effect and performance. Since the directivity becomes sharp, it becomes difficult to adjust the incident direction from the base station. Therefore, it is difficult to directly face the incident wave from the base station with sharp directivity at high gain.

Therefore, there is a need for a mechanism capable of adjusting according to the incidence angle.

A mechanical adjustment mechanism that adjusts the orientation of the entire reflector is also conceivable. A configuration in which the angle of reflection is variable by a two-layer structure is also known (Non-Patent Literature 1).

PRIOR ART

Patent Literature

Non-Patent Literature 1 "Configuration of Variable Reflection Angle Meta-surface using Double Layered Patch Type FSS", IEICE technical report, Vol. 114 (522), pp. 13-16, Mar. 19, 2015, Kuze Ryuji etc.

SUMMARY OF THE INVENTION

Problems to be Solved by the Invention

However, adjusting the incident direction mechanically, such as changing the orientation of the entire reflector, requires a mechanism for mechanical adjustment and causes the entire equipment to be large, and the advantage of the reflector, that the reflector itself is thin and does not require a large space for installation, can not be acquired.

If a two-layer structure is used to make the reflection angle variable, the structure will become large.

Therefore, one object of the present invention is to make it possible to flexibly adjust the incident directivity in the vertical plane or the horizontal plane by making the incident directivity reconfigurable.

Another object of the present invention is to realize the above adjustment by a single layer instead of by lamination.

Means for Solving the Problems

In one embodiment of the present invention, the variable reflect array has, a plurality of supercells, the supercell having different incidence angle and reflection angle with respect to an electromagnetic wave of a predetermined wavelength, and a variable mechanism unit configured to change interval between the plurality of supercells, and, the supercell is composed of a plurality of unit cells, each unit cell has an antenna, and, the variable unit comprises a supercell spacing adjustment unit configured to arrange the plurality of supercells at an interval selected from two or more intervals, wherein, the variable mechanism unit is configured to change one of the incidence angle and the reflection angle with respect to the electromagnetic wave of the predetermined wavelength, and, keep the other of the incidence angle and the reflection angle constant with respect to the electromagnetic wave of the predetermined wavelength by changing the interval between the plurality of supercells.

With this configuration mentioned above, it is possible to flexibly adjust the incident directivity or the reflected directivity in the vertical or horizontal plane by reconfiguring the incident directivity or the reflected directivity. In addition, with the configuration, it is possible to achieve this adjustment with a single layer instead of a multilayer, and while maintaining the advantage of a thin reflector that does not require a large installation space, installation of the variable reflect array to the direction of the incident wave from the base station is easily executed, and configuration which allows adjustment according to the incidence angle is achieved, even when the variable reflect array has sharp directivity for the electromagnetic waves at high gain.

In the variable reflect array of one embodiment of the present invention, the incidence angle or the reflection angle is changed by 10 degrees or more by changing the spacing of the supercells in the variable mechanism unit.

In the variable reflect array of one embodiment of the present invention, the incidence angle or the reflection angle decreases when the interval of the supercell increases from a predetermined interval, and, the incidence angle or the reflection angle increases when the interval of the supercell decreases from the predetermined interval.

In the variable reflect array of one embodiment of the present invention, the electromagnetic wave with the predetermined wavelength has polarization other than horizontal polarization and vertical polarization, and inclined by a predetermined angle from the horizontal direction, and, the unit cells are arranged in a direction inclined by a predetermined angle from the horizontal direction to the same direction as the polarized wave, with respect to the predetermined electromagnetic wave.

In the variable reflect array of one embodiment of the present invention, the electromagnetic wave with the predetermined wavelength is a 45° polarized wave, and, the unit cells are arranged with an inclination of 45° from the horizontal direction.

In the variable reflect array of one embodiment of the present invention, the supercells are arranged in a direction perpendicular to the longitudinal direction of the supercell, and, the supercells are shifted by a predetermined amount in the longitudinal direction of the supercell.

In the variable reflect array of one embodiment of the present invention, the supercell comprises a first plurality of supercells and a second plurality of supercells, and, the first plurality of supercells are arranged in a direction perpendicular to the longitudinal direction of the supercells and shifted by a predetermined amount in a first direction, which is one of the longitudinal directions of the supercells, and the second plurality of supercells are arranged in a direction perpendicular to the longitudinal direction of said supercells and shifted by a predetermined amount in a second direction opposite to the first direction.

In the variable reflect array of one embodiment of the present invention, the unit cell comprises substantially linear metal plates radially extending from the center of the unit cell.

In the variable reflect array of one embodiment of the present invention, the unit cell is a cross dipole comprising a substantially cross-shaped metal plate.

With this configuration, the variable reflect array can be operated at two orthogonally polarized waves.

In the variable reflect array of one embodiment of the present invention, both the incidence angle and the reflection angle are configured to be changed by changing of the spacing of the supercells.

The method for designing a variable reflect array of one embodiment of the present invention is a method for designing a variable reflect array according to any one of the mentioned above, having a step of changing one of the incidence angle and the reflection angle while keeping the other of the incidence angle and the reflection angle constant, with respect to the electromagnetic wave of the predetermined wavelength, by changing the interval of the plurality of supercells.

A method for designing a variable reflect array of one of the present invention is the method for designing a variable reflect array wherein the reflect array comprises a plurality of supercells having different incidence angle and reflection angle with respect to electromagnetic waves of a predetermined wavelength, the supercells comprise a plurality of unit cells, and, the unit cell comprises antenna. and, the method for designing a variable reflect array comprises:

a step of designing the supercells comprising the plurality of unit cells, and, a step of changing one of the incidence angle and the reflection angle while keeping the other of the incidence angle and the reflection angle, by changing the interval between the plurality of supercells, being configured to be executed after the step of designing the supercells.

With the above configuration, the present invention can flexibly adjust the incidence directivity or the reflection directivity in the vertical or horizontal plane by reconfiguring the incident directivity or the reflected directivity. In addition, with this configuration, it is possible to achieve this adjustment with a single layer instead of a multilayer, and while maintaining the advantage of a thin reflector that does not require a large installation space, installation of the variable reflect array to the direction of the incident wave from the base station is easily executed, and configuration which allows adjustment according to the incidence angle is achieved, even when the variable reflect array has sharp directivity for the electromagnetic waves at high gain.

DETAILED DESCRIPTION

Figure 1:
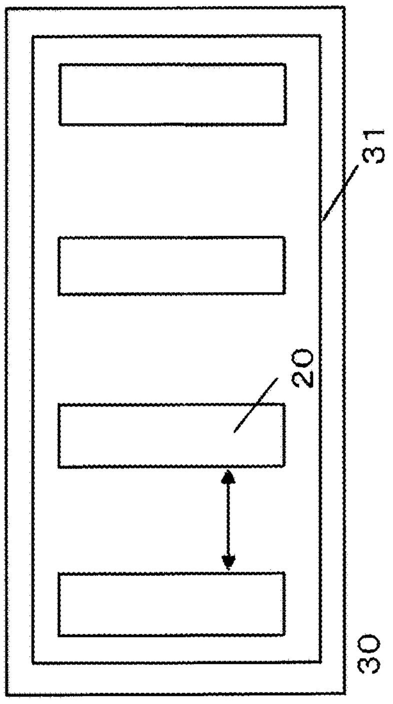
FIG. 1 shows a configuration example of a variable reflect array in one embodiment of the present invention.

FIG. 1 shows a configuration example of a variable reflect array 10 in one embodiment of the present invention. Note that the variable reflect array 10 can also be a variable reflector.

Figure 2:
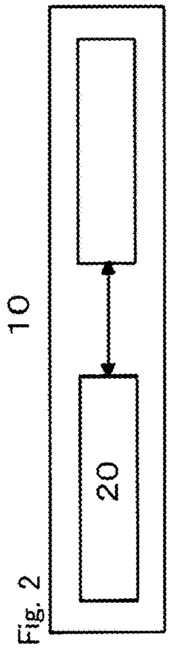
FIG. 2 shows a configuration example of a variable reflect array in one embodiment of the present invention.

The variable reflect array 10 has a plurality of supercells 20 and variable mechanisms unit 30. In a case where the supercells 20 are substantially rectangular, the spacing of the supercells 20 may be adjusted in the shorter side direction of the supercells 20 as shown in FIG. 1, or the spacing of the supercells 20 may be adjusted in the longer side direction of the supercells 20 as shown in FIG. 2.

Figure 3:
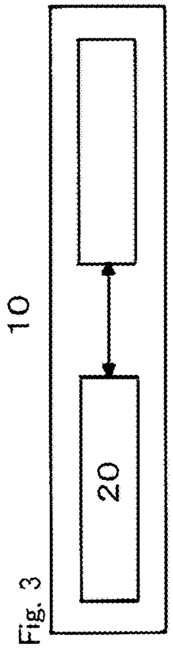
FIG. 3 shows an example metasurface in one embodiment of the present invention.

As shown in FIG. 3, the supercell 20 is a metasurface with different angles of incidence and reflection for electromagnetic waves of a given wavelength. In FIG. 3, the negative reflection direction and the positive reflection direction are superimposed.

Figure 4:
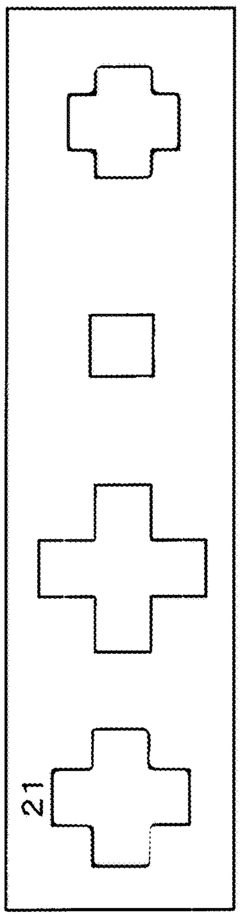
FIG. 4 shows a configuration example of a supercell in one embodiment of the present invention.

As shown in FIG. 4, the supercell 20 is composed of a plurality of unit cells 21.

Figure 5:
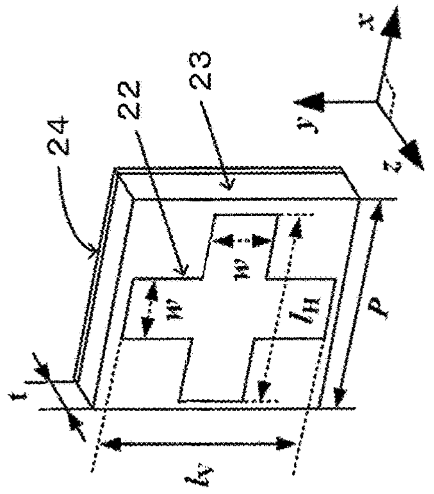
FIG. 5 shows a configuration example of a unit cell in one embodiment of the present invention.

As shown in FIG. 5, in this embodiment, the unit cell 21 has an antenna having substantially linear metal plates and the metal plates radially extend from the center of the unit cell 21.

In this embodiment, the unit cell 21 has a cross-shaped resonator 22 as an antenna, arranged on the surface of the dielectric substrate 23, and has a ground layer 24 on the back surface of the dielectric substrate 23. Here, the cross shape may include a substantially square shape in one embodiment. Further, the antenna may be a substantially linear antenna instead of the cross-shaped dipole as in this embodiment.

Although it is described that "a plurality of supercells having different incidence angle and reflection angle with respect to an electromagnetic wave of a predetermined wavelength", it may include the case where the incidence angle and the reflection angle become the same when the spacing of the supercells 20 is adjusted. In other words, the supercells 20 constitutes a metasurface, and the angle of incidence and the angle of reflection are not restricted to be basically the same, which means that they can be changed by adjustment.

Figure 6:
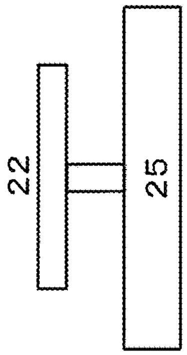
FIG. 6 shows a configuration example of a unit cell in one embodiment of the present invention.

FIG. 6 shows the configuration of the unit cell 21 in one embodiment, seen from the lateral direction, that is, from the horizontal direction.

In this embodiment, the unit cell 21 has a cross-shaped resonator 22, and the resonator 2 has a so-called mushroom shape supported on a substrate 25 via a support portion.

Figure 7:
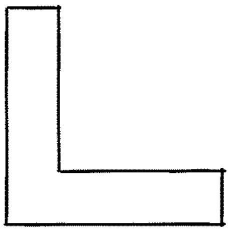
FIG. 7 shows a configuration example of a unit cell in one embodiment of the present invention.

FIG. 7 shows the configuration of the unit cell 21 in one embodiment seen from above.

In this embodiment, the unit cell 21 has an L-shaped resonator 22 extending longitudinally and laterally within the horizontal direction. The resonator 22 is a so-called mushroom type one supported on the substrate 25 via a support unit, but may be arranged on the surface of the dielectric substrate 23 and have the ground layer 24 on the back surface of the dielectric substrate 23.

Next, method for designing the supercell 20 is described.

The supercell 20 is designed by deriving the cell size D from the relational expression of the incidence angle theta i, the reflection angle theta r, the wavelength lambda 0 and the mode m according to the desired incidence angle and reflection angle.

$$D = \frac{m\lambda_0}{\lfloor \sin\theta_i - \sin\theta_r \rfloor} \quad \text{Equation 1}$$

In a case where the angle of reflection is kept constant and the angle of incidence is variable, the length of the supercell 20 will be changed, but the phase gradient will not change. For example, it can be designed as follows.

Length of the supercell 20 is 11.2 mm in a case with incidence at minus 5 degree angle and reflection at 60 degree angle, and length of the supercell 20 is 12.3 mm in a case with incidence at 0 degree angle and reflection at 60 degree angle, and length of the supercell 20 is 13.7 mm in a case with incidence at 5 degree angle and reflection at 60 degree angle.

Figure 8:
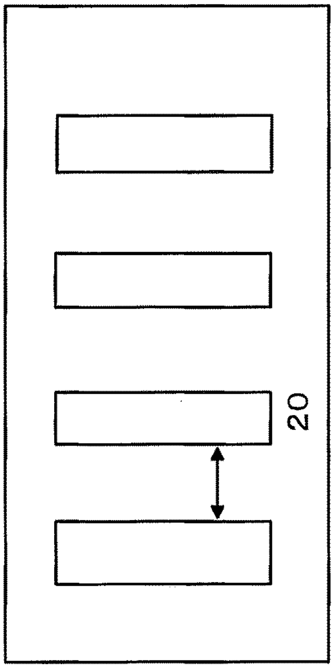
FIG. 8 shows a configuration example of a variable reflect array in one embodiment of the present invention.
Figure 9:
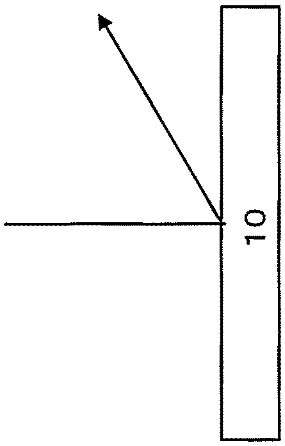
FIG. 9 shows a configuration example of a variable reflect array in one embodiment of the present invention.
Figure 10:
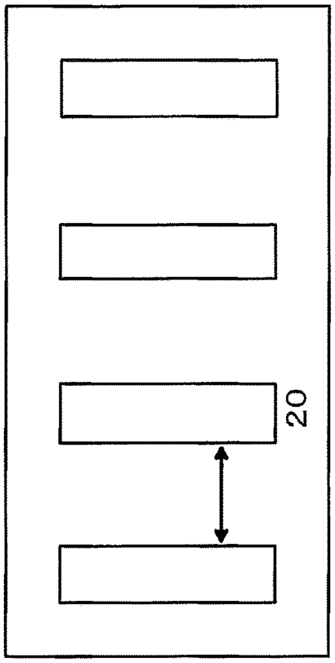
FIG. 10 shows a configuration example of a variable reflect array in one embodiment of the present invention.
Figure 11:
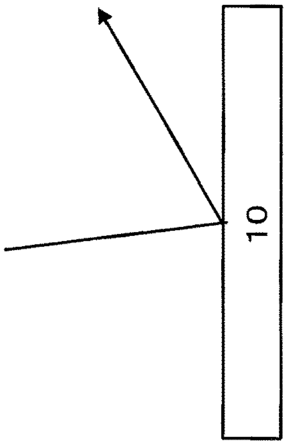
FIG. 11 shows a configuration example of a variable reflect array in one embodiment of the present invention.
Figure 12:
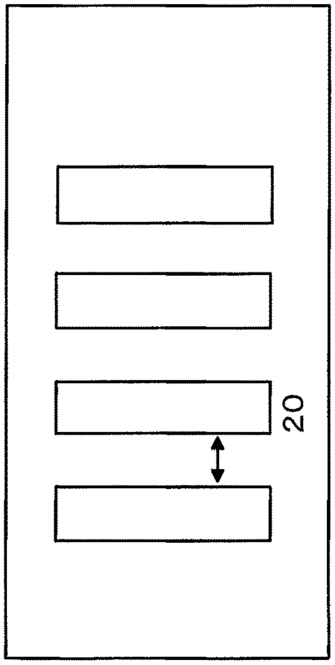
FIG. 12 shows a configuration example of a variable reflect array in one embodiment of the present invention.
Figure 13:
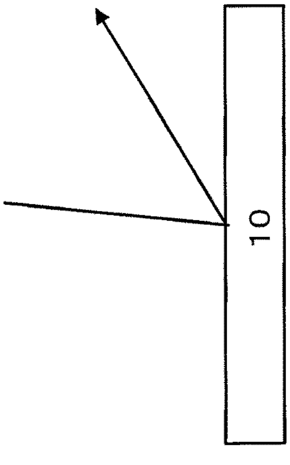
FIG. 13 shows a configuration example of a variable reflect array in one embodiment of the present invention.

FIGS. 8 and 9 show the variable reflect array 10 with cell spacing for an incidence angle of 0 degree. On the other hand, the variable reflect array corresponds to an incidence angle of +5 degrees if the interval between the unit cells 21 is increased by 1.2 mm as shown in FIGS. 10 and 11, and the variable reflect array corresponds to an incidence angle of −5 degrees if the interval between the unit cells 21 is decreased by 1.2 mm as shown in FIGS. 12 and 13. In this way, by adjusting the interval between the unit cells 21 within 1.2 mm, it is possible to make the variable reflect array correspond to incidence angles from −5 degrees to +5 degrees.

In this way, by adjusting the horizontal spacing of the supercells 20 while keeping the phase gradient (supercells 20) unchanged, it is possible to make the angle of incidence variable while keeping the angle of reflection constant.

The variable mechanism unit 30 varies interval, or spacing, between the plurality of supercells 20, and has a substrate unit and a supercell side fixing unit such that the variable mechanism unit 30 is fixed to the substrate unit via the supercell side fixing unit, and the interval between supercells 20 can be selected from intervals of two or more. In particular, the present embodiment allows the interval to be selected from a continuum of values.

The variable mechanism 30 has a supercell spacing adjustment unit 31 that arranges a plurality of supercells 20 at interval selected from two or more intervals. The variable mechanism 30 may have a structure in which the spacing can be further changed after the supercells 20 are fixed at a desired spacing. Adjustments can be facilitated if the spacing is variable. Alternatively, the variable mechanism 30 may have a configuration in which the spacing cannot be changed after the supercells 20 are fixed at a desired spacing. A configuration in which the interval cannot be changed can have a strong structure. The variable mechanism 30 and the supercell spacing adjusting section 31 can have any structure which allow manual or automatic adjustment of the spacing of the supercell 20 at the time of manufacturing etc., or manual or automatic adjustment of the position of the supercell-side fixing unit.

Needless to say that, in addition to the case described above, the angle of reflection can also be adjusted while the angle of incidence remains constant.

In this way, the variable mechanism unit 30 changes one of the incidence angle and the reflection angle with respect to the electromagnetic wave of the predetermined wavelength while keeping the other of the incidence angle and the reflection angle constant with respect to the electromagnetic wave of the predetermined wavelength, by changing the interval between the plurality of supercells 20.

The incidence angle or the reflection angle decreases when the interval of the supercells 20 increases from a predetermined interval, and the incidence angle or the reflection angle increases when the interval of the supercells 20 decreases from the predetermined interval.

With this configuration, it is possible to flexibly adjust the incident directivity or the reflected directivity in the vertical or horizontal plane by reconfiguring the incident directivity or the reflected directivity. In addition, with the configuration, it is possible to achieve this adjustment with a single layer instead of a multilayer, and while maintaining the advantage of a thin reflector that does not require a large installation space, installation of the variable reflect array to the direction of the incident wave from the base station is easily executed, and configuration which allows adjustment according to the incidence angle is achieved, even when the variable reflect array has sharp directivity for the electromagnetic waves at high gain.

In one embodiment, in the variable reflect array 10, the incidence angle or the reflection angle is changed by 10 degrees or more by changing the interval of the supercells 20 in the variable mechanism unit 30.

Figure 14:
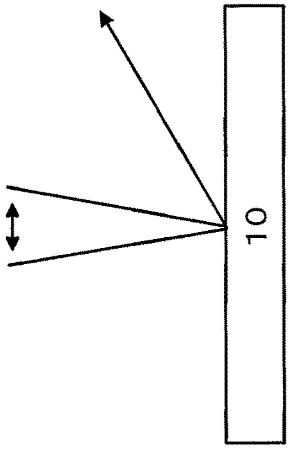
FIG. 14 shows a configuration example of a variable reflect array in one embodiment of the present invention.
Figure 15:
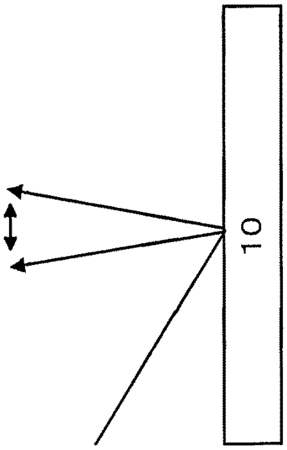
FIG. 15 shows a configuration example of a variable reflect array in one embodiment of the present invention.

FIG. 14 shows a reflectance reflect array in which the incidence angle is changed by 10 degrees or more. FIG. 15 shows a reflective reflect array in which the reflection angle is changed by 10 degrees or more.

When installing the variable reflect array 10, it is difficult to make fine adjustments to face the base station while it is often easy to install in the direction of the base station with approximate accuracy. Therefore, if the adjustment can be made within a range of about 10 degrees, both installation and adjustment are facilitated.

As mentioned above, the structure where a plurality of supercells 20, which are aggregates of unit cells 21 constituting the metasurface reflect array, are aggregated, and the horizontal spacing or the horizontal positional relationship of the aggregates in the vertical direction is variable, allows the incident directivity to be flexibly adjusted while the reflection direction is kept constant.

In addition to that, it is possible to adjust both the horizontal plane directivity and the vertical plane directivity. Further, when the relationship between the incident direction and the reflection direction is altered, it is possible to adjust the reflection directivity while the incident direction is fixed.

By the way, for vertically polarized wave or horizontally polarized wave, the gain tends to decrease when the incidence direction changes to the reflection direction side. Further, when the incidence angle is increased, side lobes in the front direction tend to increase.

Figure 16:
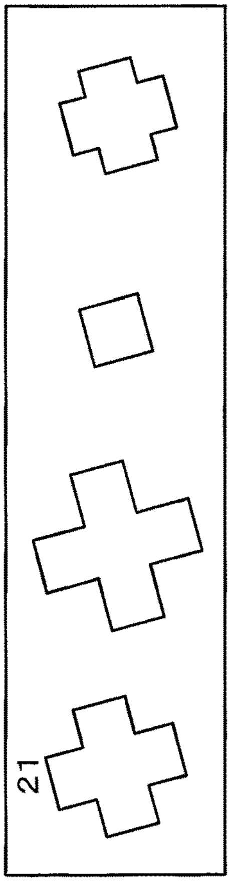
FIG. 16 shows a configuration example of a supercell in one embodiment of the present invention.

In one embodiment, the variable reflect array 10 shown in FIG. 16 reflects electromagnetic waves having polarizations other than horizontal polarization and vertical polarization inclined by a predetermined angle from the horizontal direction. The unit cell 21 is arranged in a direction inclined by a predetermined angle from the horizontal direction to the same direction as the polarized wave, with respect to the polarized wave, tilted at a predetermined angle from the horizontal direction. Here, "inclined by a predetermined angle" "to the same direction as the polarized wave" means that they are arranged at a tilt that is substantially the same as the rotation angle of the polarization.

Figure 17:
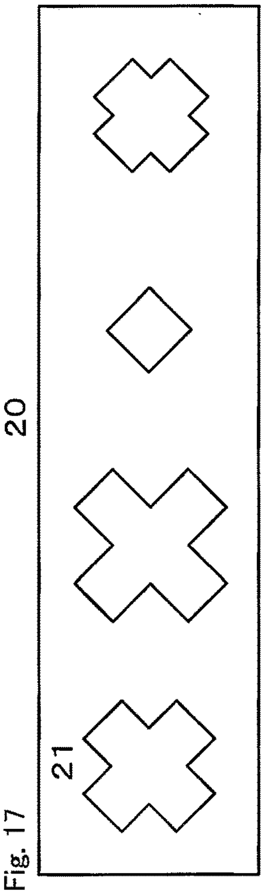
FIG. 17 shows a configuration example of a supercell in one embodiment of the present invention.

In one embodiment, the electromagnetic wave above described having a polarized wave tilted at a predetermined angle from the horizontal direction is a 45 degree polarized wave, and the unit cells 21 are arranged with an inclination of 45 degrees from the horizontal direction, in the variable reflect array 10 shown in FIG. 17.

Even in the case of the 45 degree polarized wave, when the unit cells are arranged with the inclination of 45 degrees around the Z axis, ie, the direction perpendicular to the plane of FIG. 14, the angle of incidence can be adjusted while maintaining the angle of reflection constant. In addition to that, side lobes, such as the amount of reflection in the front direction, are improved by −10 dB or more compared to VH polarized waves such as the above-described horizontally polarized waves and vertically polarized waves.

Figure 18:
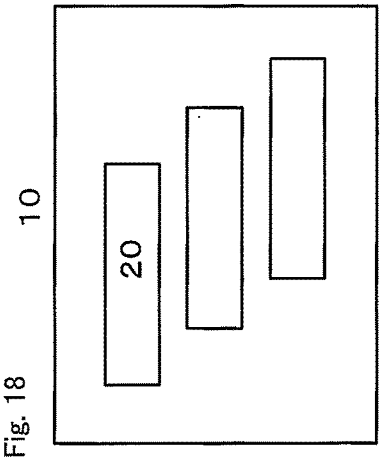
FIG. 18 shows a configuration example of a variable reflect array in one embodiment of the present invention.

As shown in FIG. 18, instead of adjusting the horizontal spacing, the horizontal supercells 20 are arranged vertically and shifted horizontally by a constant spacing, so that tilting can be applied. That is, in the reflection in the vertical direction (vertical direction in the drawing), the reflected wave or the incident wave can be tilted with respect to the vertical direction.

In this embodiment, the supercell has a plurality of first supercells and a plurality of second supercells.

The supercells 20 are arranged in a direction perpendicular to the longitudinal direction of the supercells 20 and are arranged with a predetermined shift in the longitudinal direction of the supercells 20.

Figure 19:
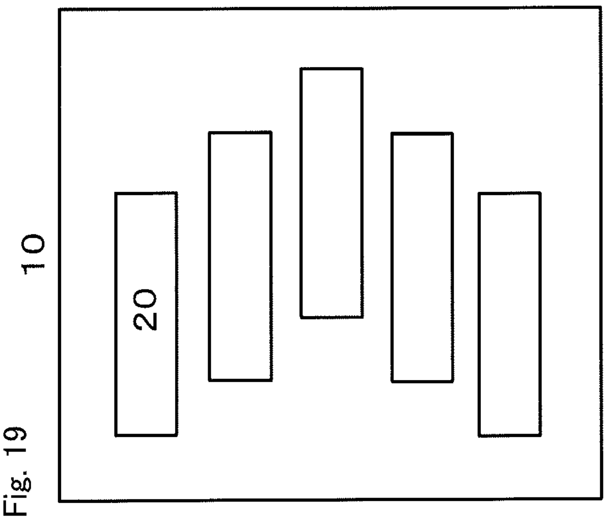
FIG. 19 shows a configuration example of a variable reflect array in one embodiment of the present invention.

Also, as shown in FIG. 19, the horizontal supercells 20 are vertically arranged and shifted to the right by a predetermined number and to the left by a predetermined number at regular interval in the horizontal direction, so that the beam can be widened.

In this embodiment, the first plurality of supercells 20 are arranged in a direction perpendicular to the longitudinal direction of the supercells 20 and shifted by a predetermined amount in a first direction, which is one direction of the longitudinal directions of the supercells 20, and, the plurality of second supercells 20 are arranged in a direction perpendicular to the longitudinal direction of the supercells 20 and shifted by a predetermined amount in a second direction opposite to the first direction.

Figure 20:
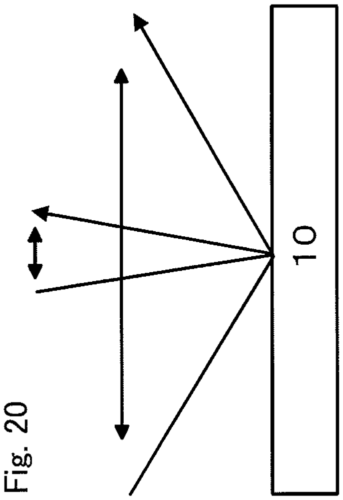
FIG. 20 shows a configuration example of a variable reflect array in one embodiment of the present invention.

In one embodiment, as shown in FIG. 20, both the incidence angle and the reflection angle are changed by changing of the spacing of supercells 20.

With this configuration, it is possible to flexibly respond to both the incidence angle and the reflection angle.

Figure 21:
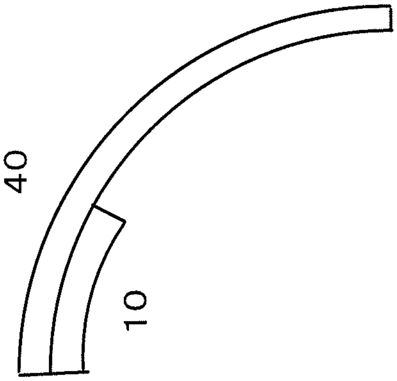
FIG. 21 shows a configuration example of a variable reflect array in one embodiment of the present invention.

FIG. 21 shows an embodiment of the variable reflect array 10. In this embodiment, the variable reflectance array 10 is flexible, and can be installed on a curved surface, and is installed on the cover 40.

In many cases, the curved surface to be installed has a fixed radius of curvature. For this reason, it is often easy to design the variable reflect array 10 according to the curved surface in advance.

In one embodiment, the method for designing the variable reflect array 10 has a step of changing one of the incidence angle and the reflection angle while keeping the other of the incidence angle and the reflection angle constant, with respect to the electromagnetic wave of the predetermined wavelength, by changing the interval of the plurality of supercells 20. By this method of designing the variable reflect array 10, any of the variable reflect arrays 10 described so far can be designed.

In one embodiment, the variable reflect array 10 designed by the method for designing the variable reflect array 10 has a plurality of supercells 20 having different incidence angle and reflection angle with respect to electromagnetic waves of a predetermined wavelength, and the supercells comprise a plurality of unit cells 21, and the unit cell 21 has an antenna.

Figure 22:
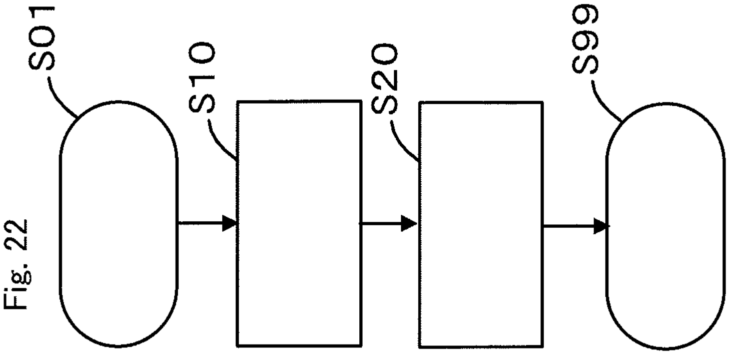
FIG. 22 shows an example of a designing method of a variable reflect array in one embodiment of the present invention.

As shown in FIG. 22, the method for designing a variable reflect array has a step of designing the supercells 20 comprising the plurality of unit cells 21, and, a step of changing one of the incidence angle and the reflection angle while keeping the other of the incidence angle and the reflection angle, by changing the interval between the plurality of supercells 20, being configured to be executed after the step of designing the supercells 20.

It goes without saying that the present invention is not limited to the above-described embodiments and includes various embodiments without departing from the spirit and scope of the present invention.

EXPLANATION OF REFERENCE NUMERALS

10 variable reflect array
20 supercell
21 unit cell
22 resonator
23 dielectric

24 ground layer
25 substrate
30 variable mechanism unit
31 supercell interval adjustment unit
40 cover unit

The invention claimed is:

1. A variable reflect array comprising:

a substrate unit having a supercell side; and a plurality of supercells disposed on the supercell side of the substrate unit with an interval between adjacent supercells of the plurality of supercells, each of the plurality of supercells having an incidence angle and a reflection angle with respect to an electromagnetic wave of a predetermined wavelength, wherein the interval between the plurality of supercells is changeable, and the interval is selected from two or more intervals, wherein each of the plurality of supercells includes a dielectric substrate and a plurality of unit cells disposed on a surface of the dielectric substrate, each unit cell has an antenna, and, wherein the interval between the plurality of supercells is changed to change one of the incidence angle and the reflection angle with respect to the electromagnetic wave of the predetermined wavelength and keep the other of the incidence angle and the reflection angle constant with respect to the electromagnetic wave of the predetermined wavelength.

2. The variable reflect array according to claim 1, wherein the incidence angle or the reflection angle is changed by 10 degrees or more by changing the spacing of the plurality of supercells.

3. The variable reflect array according to claim 1, wherein the incidence angle or the reflection angle decreases when the interval of the plurality of supercells increases from a predetermined interval, and, the incidence angle or the reflection angle increases when the interval of the plurality of supercells decreases from the predetermined interval.

4. The variable reflect array according to claim 1, wherein the electromagnetic wave with the predetermined wavelength has a polarization inclined by a predetermined angle from a horizontal direction, and, the unit cells are arranged in a direction inclined by a predetermined angle from the horizontal direction to the same direction as the polarized wave, with respect to the predetermined electromagnetic wave.

5. The variable reflect array according to claim 4, wherein the electromagnetic wave with the predetermined wavelength is a 45 degree polarized wave, and, the unit cells are arranged with an inclination of 45 degrees from the horizontal direction.

6. The variable reflect array according to claim 1, wherein the plurality of supercells are arranged in a direction perpendicular to a longitudinal direction thereof, and, the plurality of supercells are shifted by a predetermined amount in the longitudinal direction thereof.

7. The variable reflect array according to claim 1, wherein the plurality of supercells comprises a first plurality of supercells and a second plurality of supercells, and, the first plurality of supercells are arranged in a direction perpendicular to a longitudinal direction thereof and shifted by a predetermined amount in a first direction, which is one of the longitudinal directions of the plurality of supercells, and the second plurality of supercells are arranged in a direction perpendicular to the longitudinal direction thereof and shifted by a predetermined amount in a second direction opposite to the first direction.

8. The variable reflect array according to claim 1, wherein the unit cell comprises substantially linear metal plates radially extending from the center of the unit cell.

9. The variable reflect array according to claim 1, wherein the unit cell is a cross dipole comprising a substantially cross-shaped metal plate.

10. The variable reflect array according to claim 1, wherein both the incidence angle and the reflection angle are configured to be changed by changing of the spacing of the supercells.

11. A method for designing a variable reflect array according to claim 1, comprising:

a step of changing one of the incidence angle and the reflection angle while keeping the other of the incidence angle and the reflection angle constant, with respect to the electromagnetic wave of the predetermined wavelength, by changing the interval of the plurality of supercells.

12. A method for designing a variable reflect array wherein the reflect array comprises;

a substrate unit having a supercell side; and a plurality of supercells disposed on the supercell side of the substrate unit with an interval between adjacent supercells of the plurality of supercells, each of the plurality of supercells having an incidence angle and a reflection angle with respect to electromagnetic waves of a predetermined wavelength, wherein each of the plurality of supercells includes a dielectric substrate and a plurality of unit cells disposed on a surface of the dielectric substrate, and, the plurality of unit cells comprise an antenna, the method for designing a variable reflect array comprises:

a step of designing the plurality of supercells comprising the plurality of unit cells, and, a step of changing one of the incidence angle and the reflection angle while keeping the other of the incidence angle and the reflection angle, by changing the interval between the plurality of supercells, being configured to be executed after the step of designing the supercells.

* * * * *